No. 767,616. PATENTED AUG. 16, 1904.
J. WEICHHART.
BELT SHIFTING DEVICE.
APPLICATION FILED FEB. 23, 1904.
NO MODEL.

Witnesses:
F. C. Fliedner

Inventor,
John Weichhart
Geo. H. Strong
Atty

No. 767,616.

Patented August 16, 1904.

UNITED STATES PATENT OFFICE.

JOHN WEICHHART, OF SAN FRANCISCO, CALIFORNIA.

BELT-SHIFTING DEVICE.

SPECIFICATION forming part of Letters Patent No. 767,616, dated August 16, 1904.

Application filed February 23, 1904. Serial No. 194,796. (No model.)

*To all whom it may concern:*

Be it known that I, JOHN WEICHHART, a citizen of the United States, residing at San Francisco, in the county of San Francisco and State of California, have invented new and useful Improvements in Belt-Shifting Devices, of which the following is a specification.

My invention relates to improvements in belt-shifting apparatus.

It consists of the parts and the construction and combination of parts, as hereinafter more fully described, having reference to the accompanying drawings, in which—

Figure 1:
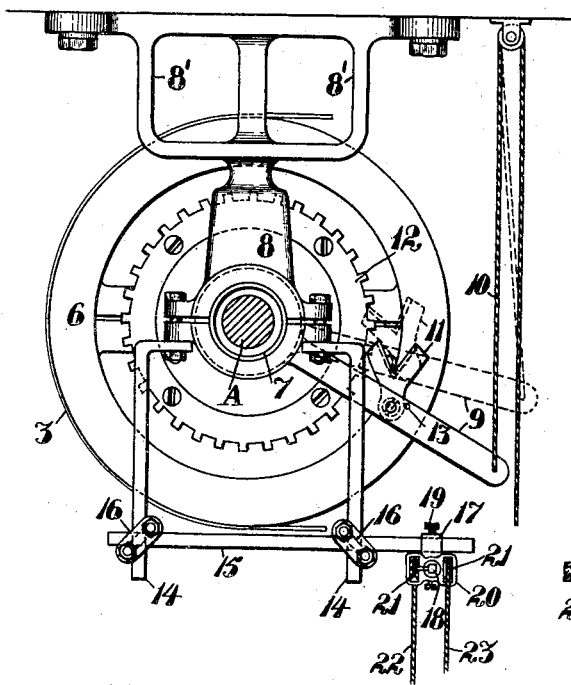
Figure 2:
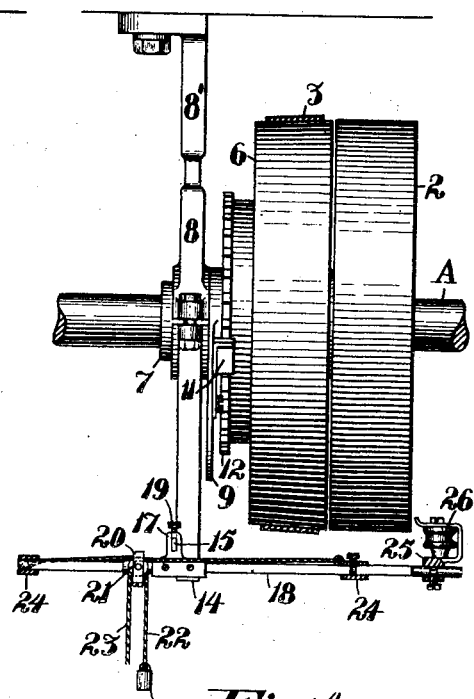
Figure 3:
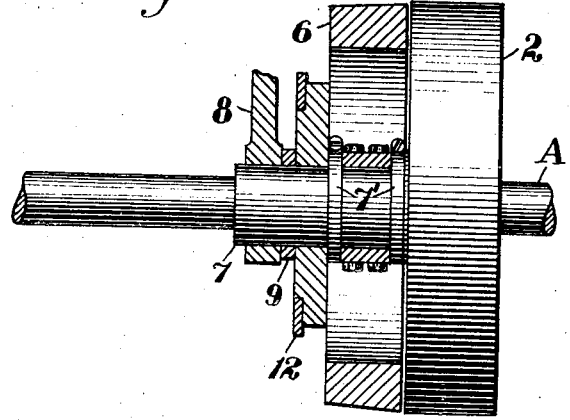
Figure 4:
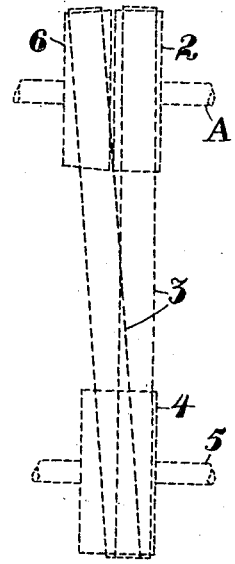

Figure 1 is a side elevation of my invention. Fig. 2 is a view at right angles to that shown in Fig. 1. Fig. 3 is a view in partial section, showing hanger for the belt-carrier. Fig. 4 is a diagrammatic view showing a belt when in position on the drive-pulley and when at rest on the carrier.

A represents a drive-shaft run constantly from any suitable source of power; 2, a fast pulley thereon whence motion is transmitted by belt 3 to a pulley 4 on counter-shaft 5; 6, an idle pulley or carrier in juxtaposition and coaxial with pulley 2 and supported on the stationary sleeve 7. The latter surrounds but is out of contact with shaft A and is supported in the hanger-arm 8. The carrier 6 is held against lateral movement by the flanges or rings 7' on the sleeve.

A lever 9, fulcrumed on sleeve 7 and reciprocal by means of cord 10 from any convenient point, carries a forked reversible pawl 11, which is arranged to engage a ratchet 12 on carrier 6 to rotate the latter. The limit of movement of lever 9 and the positioning of pawl 11 are such that when the lever is down, as shown in full lines, Fig. 1, the pawl will fall outward by gravity against a stop 13 to permit the carrier to revolve without check free from engagement with the ratchet; but when the lever is lifted to a point as indicated in dotted lines the center of gravity of the pawl is shifted relative to its pivot, so that the pawl will fall forward into engagement with one ratchet to cause the carrier to revolve. The teeth of ratchet 12 are made square, as shown, so that they may be engaged from both sides to revolve the carrier in either direction. The pawl is made reversible, so that lever 9 may be hung from in front or rear of the carrier, since it is essential that carrier 6 be always operated to turn in the same direction with the belt. This pawl-and-ratchet construction permits of the belt being run in either direction.

The carrier 6 is not only a trifle less in diameter than the drive-pulley 2, but is preferably in the form of a truncated cone, with the diameter of that side adjacent to pulley 2 a little greater than that of the side farthest from the pulley. This outward taper of the periphery of the carrier is very slight and is such that that portion of the carrier which happens to be engaged by the belt will lie approximately in the arc described by the belt as it is turned on pulley 4 as a pivot in shifting it from pulley 2 onto the carrier, or vice versa, as indicated diagrammatically in Fig. 4. The object of reducing the diameter of pulley 6 in the first place is to compensate for throwing the belt out of line and not stretch it, as would happen if both pulleys 6 and 2 were of the same size, while by sloping the face of the carrier-pulley 6 both edges of the belt are more equally sustained than were the pulley-face straight. When the belt is shifted from the drive-pulley 2 onto the carrier, the latter makes but a few revolutions and comes to a standstill as soon as the momentum of the belt is exhausted. As the belt stands out of line when resting on the carrier, its tendency is to creep back onto the drive-pulley whenever a rotative movement is given the carrier in the same direction with the drive-pulley. The carrier-pulley is motionless except for an instant when the belt is moving onto or off of it. The belt is dead and comparatively slack when on the carrier, thereby resulting in a saving of power and an increase in the life of the belt.

I have here shown a simple and novel means for shifting the belt from the drive-pulley to the carrier and holding it there temporarily until the belt stops. This belt-shifter is so constructed that it may be adjusted to shift a belt running in either direction or at any angle. If the belt runs onto the drive-pulley from the bottom, the shifting mechanism may be attached to the bottom of the hanger. If the belt comes onto the top of the driven pulley, the shifting mechanism may be attached above. As illustrated it is adapted to shift a belt approaching the drive-pulley from the bottom. Accordingly I employ two vertical angles 14, bolted to the hanger, to afford a suitable support for the shifting mechanism, which latter includes a bar 15, clamped to the angles at any desired inclination by means of the clips 16. This bar 15 carries an adjustable box 17 at one end in which the shifting rod or arm 18 is reciprocal at right angles to bar 15 and transverse to the belt. The inside of box 17 and the sliding surface of arm 18 are made polygonal to prevent the latter from turning. The box is adjustable back and forth on bar 15 by means of a set-screw 19. One end of the box is rounded and carries a bracket 20, in which are journaled two rollers 21, which serve as guides for the ropes 22 23, by which the shifting rod 18 is reciprocated. This bracket is likewise adjustable to any desired angle. The shifting rod is provided with two collars 24, adjustable according to the width of the belt and at any angle. These collars limit the length of stroke of the rod and at the same time serve as points of attachment for the ropes 22 23. An end of rod 18 is rounded and grooved and carries an adjustable bracket 25, in which is a roller 26, arranged to lie in the same plane with the belt and to engage the edge of the belt farthest from the carrier-pulley 6. Rope 22 carries a weight 27, by which the shifting rod is normally projected across the belt away from the carrier-pulley and clear of the belt. The other rope, 23, leads to any convenient point from whence the power to pulley 4 is to be controlled.

To throw off the power from pulley 4, the operator pulls on rope 23, which causes roller 26 to engage the belt and shift it from pulley 2 to the carrier 6. The tension on rope 23 is maintained until the belt loses its momentum and stops. The operator then releases rope 23, and the counterbalance 27 acts to reciprocate the shifting rod and roller out of interference with the belt and allow the latter to be transferred from the carrier to the drive-pulley.

When the belt runs onto the carrier from the top, the bar 15, with its attachments, may be secured direct to the hanger-standards 8'. Thus in any case no support separate from the carrier-hanger is required for the shifting mechanism.

The several adjustable parts of the shifting mechanism renders it adaptable to any belt, whether running horizontal, vertical, and at any angle or whether disposed overhead or beneath the floor.

Having thus described my invention, what I claim, and desire to secure by Letters Patent, is—

1. In a belt-shifting mechanism the combination with adjacent coaxial fast and loose pulleys, of means for revolving the latter to shift the belt from one pulley to the other, said means including an oscillating arm fulcrumed coaxially with said pulleys, a double pawl pivoted on said arm, and an annular ratchet on the loose pulley and engaged by the pawl said pawl adapted to operatively engage the ratchet whether the arm is at the front or rear of the pulley, and means for operating the arm.

2. The combination of a fast pulley, a loose carrier-pulley adjacent to and coaxial with the fast pulley, an oscillating arm fulcrumed on the axis of the pulleys, said loose pulley having a ratchet, and a reversible Y-shaped pawl pivoted on the arm and having its forks adapted to operatively engage the ratchet whether the arm is at one side or the other of the pulley and thereby rotate the loose pulley in one direction or the other and means for operating the arm.

3. In belt-shifting mechanism, the combination with a fast pulley of an adjacent coaxial loose carrier-pulley, an oscillating arm fulcrumed coaxially with said pulleys, a double pawl pivoted on said arm, an annular ratchet on said loose pulley having interdental spaces with substantially parallel walls whereby said pawl and ratchet may coact to rotate the loose pulley in either direction whether the arm is at front or rear of said pulley, and means for positively operating said arm in one direction.

4. In a belt-shifter, the combination with fast and loose pulleys, of means for shifting a belt from one to the other, said means comprising a supporting-hanger and a bar fixed thereto, a box adjustably mounted on the end of said bar, a shifting bar arranged substantially at right angles to the first-named bar and passing through said box so that its ends project oppositely therefrom, pulleys supported by the box, adjustably-mounted collars on the second-named bar for limiting the stroke of the bar, and ropes passing around the last-named pulleys and having their ends attached to said collars.

5. In a belt-shifter, the combination with fast and loose pulleys, of belt-shifting means comprising a support and a bar fixed thereto, a box adjustably mounted on the end of said bar said box provided with a bracket, guide-pulleys journaled in the bracket, a bar disposed at right angles to the first-named bar and passing through said hanger, collars adjustably fixed to opposite ends of the second-named bar, a bracket adjustably fixed to the end of said second bar, and provided with a roller, and ropes passing around the guide-pulleys and connected to said collars one of said ropes provided with a weight whereby the shifting rod is normally projected across the belt away from the loose pulley and clear of the belt.

In testimony whereof I have hereunto set my hand in presence of two subscribing witnesses.

JOHN WEICHHART.

Witnesses:
   HENRY P. TRICOU,
   S. H. NOURSE.